United States Patent
Castro et al.

(10) Patent No.: US 10,215,888 B2
(45) Date of Patent: Feb. 26, 2019

(54) METHOD FOR MANUFACTURING OPTICAL LENSES AND ASSEMBLY FOR MANUFACTURING SUCH LENSES

(71) Applicant: ESSILOR INTERNATIONAL (COMPAGNIE GENERALE D'OPTIQUE), Charenton-le-Pont (FR)

(72) Inventors: Luis Castro, Charenton-le-Pont (FR); Eric Gacoin, Charenton-le-Pont (FR); Jerome Moine, Charenton-le-Pont (FR); Bernard Pons, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 721 days.

(21) Appl. No.: 14/439,374

(22) PCT Filed: Oct. 29, 2013

(86) PCT No.: PCT/FR2013/052590
§ 371 (c)(1),
(2) Date: Apr. 29, 2015

(87) PCT Pub. No.: WO2014/068247
PCT Pub. Date: May 8, 2014

(65) Prior Publication Data
US 2015/0309217 A1    Oct. 29, 2015

(30) Foreign Application Priority Data
Oct. 30, 2012 (FR) .................................... 12 60370

(51) Int. Cl.
*B24B 13/005* (2006.01)
*G02B 3/00* (2006.01)
(Continued)

(52) U.S. Cl.
CPC .............. *G02B 3/00* (2013.01); *B23K 1/0008* (2013.01); *B23K 1/19* (2013.01); *B24B 13/0055* (2013.01); *B29D 11/00942* (2013.01)

(58) Field of Classification Search
CPC .......... G02B 3/00; B23K 1/0008; B23K 1/19; B23K 13/0055; B23K 11/00942; B24B 13/005
(Continued)

(56) References Cited

U.S. PATENT DOCUMENTS 6,110,016 A * 8/2000 Coleman ................. B24B 9/146
451/390

FOREIGN PATENT DOCUMENTS

DE      10310561 A1    10/2004
DE  10 2007 040395 A1    3/2009
(Continued)

OTHER PUBLICATIONS

International Search Report, dated Jun. 30, 2014, from corresponding PCT application.

*Primary Examiner* — Robert Rose
(74) *Attorney, Agent, or Firm* — Young & Thompson (57) ABSTRACT

A method for manufacturing an optical lens, includes the steps of providing a blank (1) which includes an upper surface and a lower surface (33) for forming first and second lens surfaces (2), an edge surface (4) forming a first mechanical positioning reference point and a ramp portion (5) provided between the edge surface and the upper surface, which forms a second positioning reference point; providing a positioning ring (10) including a cavity defining an inner contour (20) concentric with the edge surface which forms a first complementary control reference point and a shoulder (21) forming a second complementary control reference point; fitting the blank into the cavity, the edge surface being (Continued)

in contact with the inner contour and the ramp portion being in contact with the shoulder; and locking the blank in position on a locking and supporting pin, the ring then being positioned there between.

20 Claims, 5 Drawing Sheets

(51) Int. Cl.
 *B29D 11/00* (2006.01)
 *B23K 1/00* (2006.01)
 *B23K 1/19* (2006.01)
(58) Field of Classification Search
 USPC .................................. 451/42, 384, 390, 460
 See application file for complete search history.

(56) References Cited

FOREIGN PATENT DOCUMENTS

| | | |
|---|---|---|
| EP | 2 199 021 A1 | 6/2010 |
| GB | 2084493 A | 4/1982 |
| WO | 99/67053 A1 | 12/1999 |

\* cited by examiner

METHOD FOR MANUFACTURING OPTICAL LENSES AND ASSEMBLY FOR MANUFACTURING SUCH LENSES

The invention relates to the field of manufacture of optical lenses.

The invention more particularly relates to processes for manufacturing such lenses having a first face and a second face opposite the first face, comprising a step of positioning the second face relative to the first face, for the machining of this second face.

The invention furthermore relates to assemblies used to manufacture such lenses.

Such manufacturing processes comprising a step of providing a lens blank, also called a semi-finished lens blank, having a preformed convex face and a concave face to be machined are already known from European patent application EP 2 199 021.

The first face, or the front face here, of the lens is formed by the face of the lens blank having a convex shape, and the second face, or the back face here, of the lens is formed by the face of the lens blank having a concave shape.

The manufacture of such a lens typically comprises steps in which the surface of the lens blank is marked.

For example, this may involve points or crosses identifying a particular point (for example the optical center of the lens or the prism reference point for a progressive lens), axis lines (for example indicating the horizontal axis along which astigmatism is corrected) and shapes bounding particular zones (for example a near vision zone or a far vision zone in the case of progressive optical lenses). Likewise, it may be necessary to produce marks allowing the lens to be identified, or other commercial marks.

These marks are generally produced by micro-engraving or are printed marks, called temporary marks.

The lens blank thus marked is then mounted on what is referred to as a supporting ring.

This ring is annular and comprises on an upper edge a plurality of visual control guides.

The operator may thus roughly position the lens blank on the ring visually by comparing the positions of the marks on the lens blank and the visual guides on the ring. If needs be, the operator may modify the position of the lens blank on the ring by moving it translationally in three directions relative to three axes of a basic orthonormal coordinate system, and in rotation also in three directions defined about each of the three axes, respectively.

The lens blank is then fastened to this ring and to a blocking pin by way of a binding material, here what is referred to as a fusible metal, extending from the front face of the lens blank as far as this blocking pin.

The ring is thus interposed between the lens blank and the blocking pin.

The blocking pin, together with the ring and the lens blank, is mounted on a blocking and controlling apparatus, which apparatus comprises an imaging device, also called a video camera, configured to image both the control guides of the ring and the marks on the lens blank.

The apparatus thus determines a first position of the lens blank relative to the ring, and more precisely of the marked convex face of the lens blank, and then determines a positioning error by comparing this first position to a preset position of the lens blank relative to the ring.

The first position of the lens blank corresponds to the actual position of the convex face of the lens blank relative to the ring and the positioning error is representative of corrections that must be made to a surface file of the concave face. This surface file is a file used in the machining of the concave face of the lens blank, which file is loaded into a machine tool to machine this concave face.

The blocking and controlling apparatus therefore transmits this positioning error and/or these coordinate corrections to a machine tool configured to machine the concave face of the lens blank on the basis of the corrected surface file, in order to form the front face of the optical lens.

The invention aims to provide a process for manufacturing optical lenses, comprising a step of positioning the back face relative to the front face of this lens, which allows positioning errors to be limited, or even almost completely prevented, and that is simple, convenient and economical.

Thus, the subject of the invention, according to a first aspect, is a process for manufacturing an optical lens having a first face and a second face opposite said first face, comprising a step of positioning said second face relative to said first face for the machining of said second face, which positioning step comprises steps of:

providing a lens blank for forming said optical lens, which lens blank has an upper face for forming said first face, a lower face, opposite said upper face, for forming said second face, and at least one positioning guide;

providing a positioning ring having at least one control guide;

mounting said lens blank on said positioning ring;

positionally blocking said lens blank on a blocking and holding pin, said positioning ring then being interposed between said lens blank and said blocking and holding pin;

characterized in that said lens blank comprises a generally circular edge face forming a first mechanical positioning guide and at least one sloped portion forming a second mechanical positioning guide, said at least one sloped portion being located between said generally circular edge face and said upper face; said positioning ring has a generally cylindrical shape and comprises a cavity defining a generally circular internal outline forming a first complementary control guide, which internal outline is concentric with said edge face of said lens blank, and a shoulder forming a second complementary control guide; and said step of mounting said lens blank on said ring comprises the step of at least partially lodging said lens blank in said cavity of said ring, said edge face of said lens blank at least partially making contact with said internal outline of said ring and said at least one sloped portion of said lens blank also making contact with said shoulder of said ring.

The process according to the invention has the advantage of simplifying the step of positioning the second face relative to the first face of the lens with a view to machining this second face, while improving the performance of this positioning by almost completely, or even completely, eliminating any possible positioning errors.

More specifically, the positioning step is made easier by virtue of the configurations of the lens blank and of the ring, and more precisely by virtue of the first and second mechanical positioning guides on this lens blank and of the first and second complementary mechanical control guides on this ring.

The first group formed from the first mechanical positioning and control guides, in other words the generally circular edge face and the generally circular internal outline that is concentric with this edge face, allows the lens blank to be reliably positioned on the ring, i.e. without subsequent checking being required (whether by eye by an operator or by a video camera). This lens blank is positioned in two translational directions corresponding to two of the axes of a basic orthonormal coordinate system, namely the directions Tx and Ty that here are located in one and the same first plane, referred to as the horizontal plane, and in two rotational directions, namely Rx and Ry, defined about the above translational directions, respectively.

The second group formed from the second mechanical positioning and control guides, in other words the one or more sloped portions and the shoulder, allows the lens blank to be reliably positioned on the ring, i.e. without subsequent checking being required (whether by eye by an operator or by a video camera). The lens blank is essentially positioned in another translational direction corresponding to the third axis of the basic orthonormal coordinate system, namely the direction Tz, which here is located in a second plane, referred to as the vertical plane, but also in the two translational directions Tx and Ty.

Once at least partially lodged on the ring, the lens blank is therefore in what is referred to as its definitive position, at least in the translational directions Tx, Ty and Tz and in the rotational directions Rx and Ry, for the machining of the second face of the lens. The position of the lens blank on the ring is here independent of the geometry of the upper face of the lens blank.

In contrast to the visual control guides of the ring used in the prior-art process, the first and second mechanical control guides of the ring used in the process according to the invention do not play an essential role in aiding visual positioning by an operator or an imaging device. Specifically, these first and second mechanical control guides on this ring rather correspond to complementary positioning guides in that each plays a practical role in and during the partial lodging of the lens blank on the ring.

It will be noted that since the positioning step takes place before the lower face of the lens blank is machined to form the second face of the lens, it is more precisely the lower face of the lens blank that is positioned relative to the first face (since in general the upper face of the lens blank has already been shaped, for example by machining, in order to form the first face of the lens).

According to preferred simple, convenient and economical features of the process according to the invention, said lens blank furthermore comprises a third mechanical positioning guide in said generally circular edge face, a flat for example, and said positioning ring comprises a third complementary control guide in said internal outline, for example a right portion, said third mechanical positioning guide and said third mechanical control guide being configured to immobilize rotationally said lens blank about an axis passing through said upper and lower faces of said lens blank, relative to said ring, when said lens blank is mounted on said ring.

The third group formed from the third mechanical positioning and control guides, for example the flat and the right portion, allows the lens blank to be reliably positioned on the ring, i.e. without subsequent checking being required (whether by eye by an operator or by a video camera). The lens blank is positioned in another rotational direction defined about the translational direction Tz, namely Rz.

Once at least partially lodged on the ring, the lens blank is therefore in what is referred to as its definitive position, in all the translational directions Tx, Ty and Tz and rotational directions Rx, Ry and Rz, without it being necessary to inspect this position, for the machining of the second face of the lens.

According to preferred simple, convenient and economical features of the process according to the invention, said lens blank furthermore comprises a third mechanical or visual positioning guide in said generally circular edge face or at the periphery of said upper face; and said process furthermore comprises a step of visually or mechanically controlling the angular position of said lens blank relative to said ring, which angular position is measured relative to an axis passing through said upper and lower faces of said lens blank, when said lens blank is mounted on said ring; and a step of determining a possible angular position error.

Here, in order to ensure the definitive position of the lens blank relative to the ring is correct, only in the other rotational direction defined about the translational direction Tz, namely Rz, a step of visual or mechanical inspection of the angular position of the lens blank is required. This step of visual or mechanical inspection may be carried out by a mechanical probe or by eye by an operator or even by an imaging device.

According to preferred, simple, convenient and economical features of the process according to the invention:
the process furthermore comprises the step of machining said lower face of said lens blank in order to form said second face of said optical lens;
the process furthermore comprises steps of trimming said lens blank to a preset diameter, polishing said previously machined second face and engraving said previously machined second face;
the step of coating said upper face of said lens blank before said step of mounting said lens blank on said positioning ring;
said positioning ring furthermore comprises an injection channel opening onto said cavity and said step of positionally blocking said lens blank on said blocking and holding pin comprises the step of injecting a binding material, for example a metal, into said injection channel;
said step of providing said lens blank comprises steps of edging at least partially the outline of said lens blank in order to form said generally circular edge face and thus form said first mechanical positioning guide of said lens blank; chamfering at least partially one portion of said lens blank, which portion is located between said generally circular edge face and said convex face, in order to form said at least one sloped portion and thus form said second mechanical positioning guide of said lens blank; and machining said third mechanical positioning guide of said lens blank into said outline of said lens blank; and/or
said step of providing said lens blank furthermore comprises a step of machining said upper face of said lens blank in order to form said upper face of said optical lens.

Another subject of the invention, according to a second aspect, is an assembly comprising a lens blank for forming an optical lens having a first face and a second face opposite said first face, and a positioning ring on which said lens blank is mounted, which lens blank has an upper face for forming said first face and a lower face, opposite said upper face, for forming said second face; characterized in that said lens blank furthermore comprises a generally circular edge face forming a first mechanical positioning guide and at least one sloped portion forming a second mechanical positioning guide, said at least one sloped portion being located between said generally circular edge face and said upper face; said positioning ring has a generally cylindrical shape and comprises a cavity defining a generally circular internal outline forming a first complementary control guide, which internal outline is concentric with said edge face of said lens blank, and a shoulder forming a second complementary control guide; said lens blank being configured to be at least partially lodged in said cavity of said ring, said edge face of said lens blank being configured to at least partially make contact with said internal outline of said ring and said at least one sloped portion of said lens blank being configured to also make contact with said shoulder of said ring.

The assembly according to the invention has the advantage of simplifying positioning of the second face relative to the first face of the lens with a view to machining this second face, while improving the performance of this positioning by almost completely, or even completely, eliminating any possible positioning errors.

More specifically, the positioning is made easier by virtue of the configurations of the lens blank and of the ring, and more precisely by virtue of the first and second mechanical positioning guides on this lens blank and of the first and second mechanical control guides on this ring.

The first group formed from the first mechanical positioning and control guides, in other words the generally circular edge face and the generally circular internal outline that is concentric with this edge face, allows the lens blank to be reliably positioned on the ring, i.e. without subsequent checking being required (whether by eye by an operator or by a video camera). The lens blank is positioned in two translational directions corresponding to two of the axes of a basic orthonormal coordinate system, namely the directions Tx and Ty that here are located in one and the same plane, referred to as the horizontal plane, and in two rotational directions, namely Rx and Ry, defined about the above translational directions, respectively.

The second group formed from the second mechanical positioning and control guides, in other words the one or more sloped portions and the shoulder, allows the lens blank to be reliably positioned on the ring, i.e. without subsequent checking being required (whether by eye by an operator or by a video camera). The lens blank is essentially positioned in another translational direction corresponding to the third axis of the basic orthonormal coordinate system, namely the direction Tz, which here is located in a plane, referred to as the vertical plane, but also in the two translational directions Tx and Ty.

Once at least partially lodged on the ring, the lens blank is therefore in what is referred to as its definitive position, at least in the translational directions Tx, Ty and Tz and in rotational directions Rx and Ry, for the machining of the second face of the lens. The position of the lens blank on the ring is here independent of the geometry of the upper face of the lens blank.

In contrast to the visual control guides of the ring used in the prior-art process, the first and second mechanical control guides of the ring of the assembly according to the invention do not play an essential role in aiding visual positioning by an operator or an imaging device. Specifically, these first and second mechanical control guides on this ring rather correspond to complementary positioning guides in that each plays a practical role in the partial lodging of the lens blank on the ring.

It will be noted that since the positioning takes place before the lower face of the lens blank is machined to form the second face of the lens, it is more precisely the lower face of the lens blank that is positioned relative to the first face (since in general the upper face of the lens blank has already been shaped, for example by machining, in order to form the first face of the lens).

According to preferred, simple, convenient and economical features of the assembly according to the invention:

said lens blank comprises a circular chamfer forming said sloped portion, which circular chamfer has a slope comprised between about 20° and about 45°, and said ring comprises a ridge defined by said shoulder, said circular chamfer bearing against said ridge when said lens blank is partially lodged in said ring;

said lens blank furthermore comprises a third mechanical positioning guide in said generally circular edge face, a flat for example, and said positioning ring comprises a third mechanical control guide in said internal outline, for example a right portion, said third mechanical positioning guide and said third mechanical control guide being configured to immobilize rotationally said lens blank about an axis passing through said upper and lower faces of said lens blank, relative to said ring, when said lens blank is partially lodged on said ring; so that the third group formed from the third mechanical positioning and control guides, the flat or right portion for example, allows the lens blank to be reliably positioned on the ring, i.e. without subsequent checking being required (whether by eye by an operator or by a video camera), in another rotational direction defined about the translational direction Tz, namely Rz;

said third mechanical positioning guide is located parallel to a nasal-temporal axis of said lens blank for forming said optical lens;

said positioning ring furthermore comprises an injection channel opening onto said cavity and said assembly furthermore comprises a blocking and holding pin on which said lens blank is configured to be positionally blocked by virtue of a binding material injected through said injection channel, said positioning ring then being interposed between said lens blank and said blocking and holding pin; and/or said ring comprises a plurality of guiding blocks regularly distributed around said cavity and defining said internal outline.

According to other preferred, simple, convenient and economical features of the assembly according to the invention:

said at least one sloped portion of said lens blank has an angle of inclination relative to said edge face of said lens blank, which angle of inclination is set so as to increase contact between said lens blank and said positioning ring depending on at least one preset constraint;

said angle of inclination of said at least one sloped portion is set depending on a characteristic representative of a perimeter of contact between said at least one sloped portion of said lens blank and said shoulder of said ring in order to ensure the stability of said lens blank in said ring; and/or said angle of inclination of said at least one sloped portion is set depending on a characteristic representative of an optically useful zone of said optical lens in order to ensure a preset aperture for said optical lens.

The optically useful zone is the zone of the optical lens that has the optical features associated with the prescription of the wearer. It is generally a question of a zone of the lens that is located in a spectacle frame when this lens is cut to the shape of the frame and fitted in the latter.

The aperture of the optical lens is representative of the size of the optically useful zone.

Figure 1:
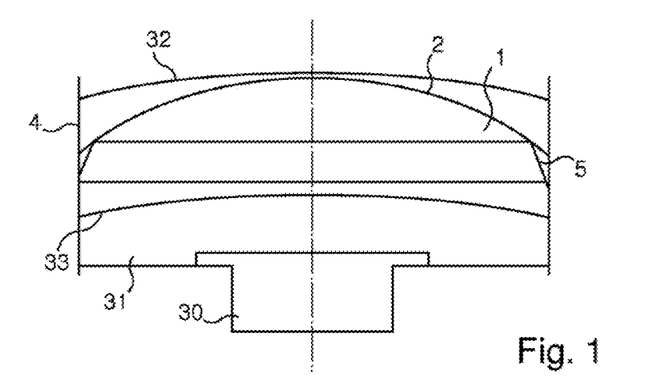
FIG. 1 schematically shows a step of the process for manufacturing an optical lens, according to the invention, here machining of the upper face and the periphery of a lens blank, in order to form the first face of the lens.
Figure 2:
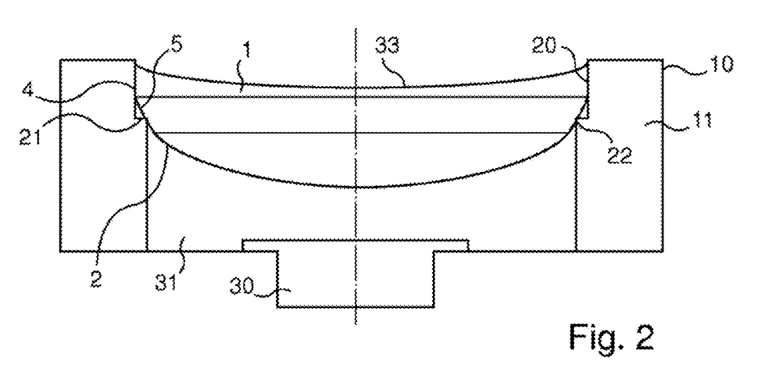
FIG. 2 schematically shows another step of the process for manufacturing the optical lens, here mounting and blocking the lens blank on a positioning ring in order to position the lower face of the lens blank relative to the first face.
Figure 3:
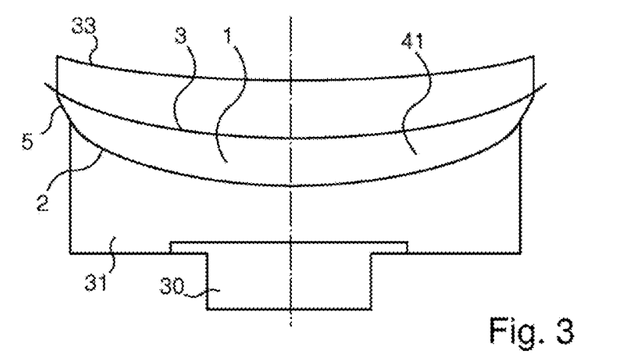
FIG. 3 schematically shows yet another step of the process for manufacturing a lens, here machining of the lower face of the lens blank, in order to form the second face of the optical lens.

The subject matter of the invention will now be explained by way of a description of one embodiment thereof, given below, by way of nonlimiting illustration, with reference to the appended drawings, in which:

FIGS. 1 and 3 illustrate various operating steps of a process for manufacturing an optical lens 1.

Here, the optical lens 1 is an optical lens configured to form a spectacle lens intended to be fitted in a pair of spectacles.

This optical lens has a first face, here corresponding to a front face 2 that has a convex shape, and a second face, here corresponding to a back face 3 that has a concave shape. This back face 3 may have a complex surface (a "free-form" or "digital" surface) that, especially because of the large altitude variations, for example combined with a torus and a progression, of the surface requires particularly precise machining and more precisely surfacing that is difficult to achieve.

It is necessary to position correctly the optical lens 1, and more precisely its (as yet unmachined) back face 3 relative to its (already machined) front face 2 in order to produce the back face 3 of the optical lens 1 in accordance with the desired ophthalmic prescription.

The optical lens is formed from a lens blank, also referenced 1, comprising a solid body generally molded from plastic.

This lens blank 1, in the raw state, also called the first semi-finished lens blank, has an upper face here corresponding to a convex face 32 and a lower face here corresponding to a concave face 33, each being intended to form the front face 2 and the back face 3 of the lens, respectively.

FIG. 1 illustrates the machining of the convex face 32, also called the front face, of the lens blank 1 and the machining of mechanical positioning guides on this lens blank 1.

FIG. 2 illustrates the positioning of the lens blank 1 in a positioning ring 10, after the machining steps illustrated in FIG. 1.

FIG. 3 for its part illustrates the machining of the concave face 33 of the lens blank 1.

Figure 9:
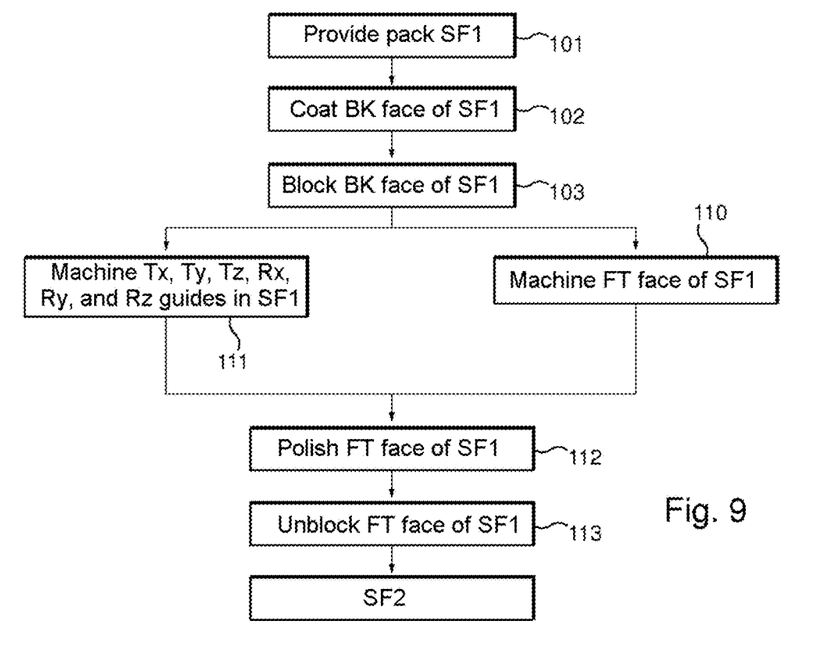
FIG. 9 is a block diagram illustrating various operating steps of the process for manufacturing the optical lens, especially comprising the step illustrated in FIG. 1.
Figure 10:
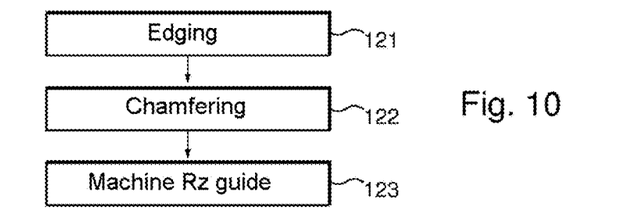
FIG. 10 is a block diagram illustrating in detail one of the steps shown in FIG. 9, namely the machining of mechanical guides into the lens blank.

The process for manufacturing the optical lens from the lens blank will be described in greater detail below with reference to FIGS. 9 to 11, which illustrate various operating steps of this manufacturing process, and with reference to FIGS. 1 to 3, which illustrate the actual implementation of certain of these steps.

The lens blank 1 that allows the optical lens to be formed, the positioning ring 10 and the interaction between this lens blank 1 and this ring 10 will now be described in greater detail.

Figure 4:
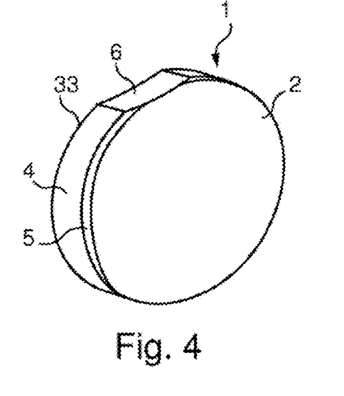
FIG. 4 is a perspective view of the lens blank, after the machining step illustrated in FIG. 1.

FIG. 4 illustrates the lens blank 1 such as shown in FIG. 2, in other words after its convex face 32 and the mechanical positioning guides have been machined.

The lens blank 1 here comprises, opposite its concave face 33, the front face 2 of the optical lens.

The lens blank 1 furthermore comprises an edge face 4 that is generally circular, a flat 6 that is located in a portion of this edge face 4, and a chamfer 5 forming a sloped portion that here is beveled and generally circular. This chamfer 5 is located between the edge face 4 and the front face 2.

Here, the chamfer 5 has a slope, or angle of inclination, relative to the edge face 4 of the lens blank 1, comprised between about 20° and about 45°.

This angle of inclination is set so as to increase contact between the lens blank 1 and the positioning ring 10 depending on at least one preset constraint (see below with reference to FIGS. 12 to 15). The lens blank 1 thus machined forms what is referred to as a second semi-finished lens blank. The first semi-finished lens blank is the lens blank 1 in its raw state, as indicated above.

The generally circular edge face 4 forms a first mechanical positioning guide, the chamfer 5 forms a second mechanical positioning guide and the flat 6 forms a third mechanical positioning guide, for positioning the lens blank (second semi-finished lens blank) 1 in the positioning ring 10.

Figure 6:
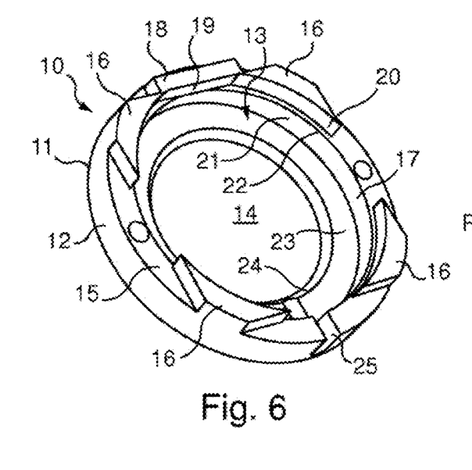
FIGS. 6 and 7 are, respectively, perspective views of the positioning ring in isolation and of this ring when the lens blank is mounted therein, as illustrated in FIG. 2.

FIG. 6 illustrates the positioning ring 10 in isolation.

This ring 10, which has a generally cylindrical shape, comprises a body 11, here made of aluminum, provided with a cylindrical lateral wall 12, an upper edge 15 and a cavity 13 opening onto either side of the ring 10.

This ring 10 furthermore comprises four guiding blocks 16 protruding from the upper edge 15, which guiding blocks 16 are configured to form an outline 20, internal to the ring 10, which is generally circular.

The guiding blocks 16 are regularly distributed along the upper edge 15.

The ring 10 also comprises a generally circular shoulder 21 defining a ridge, itself generally circular, which shoulder 21 is located between the upper edge 15 and a bottom wall 23.

This bottom wall 23 is provided with a central aperture 14 opening onto the exterior of the ring 10 and a beveled portion 24 located between this aperture 14 and the bottom wall 23.

The ring 10 furthermore comprises another guiding block 18 different from the guiding blocks 16 in that this other block 18 has a right portion 19 on the side of the cavity 13 and therefore in the generally circular internal outline 20.

This other block 18 is located between two guiding blocks 16.

The ring 10 furthermore comprises an injection channel 25 that runs through the body 11 and opens onto the cavity 13, as far as the orifice 14.

The generally circular internal outline 20 forms a first complementary control guide, the shoulder 21 and more precisely the ridge 22 form a second complementary control guide and the right portion 19 forms a third complementary control guide.

The positioning ring 10 is unitarily formed.

Figure 5:
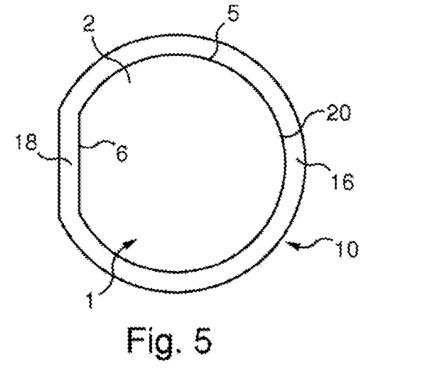
FIG. 5 schematically shows a top view of the lens blank in the positioning ring, as illustrated in FIG. 2.
Figure 7:
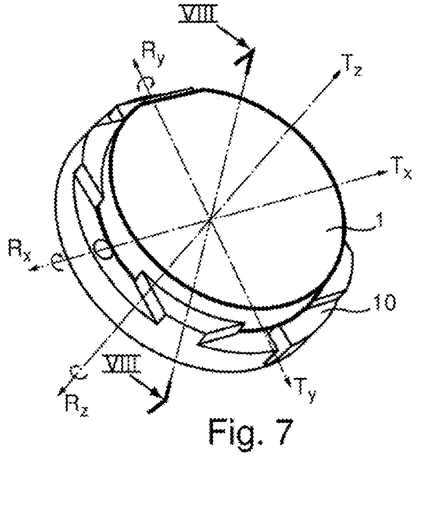

FIGS. 5 and 7 show the lens blank 1 illustrated in FIG. 4 partially lodged in the positioning ring 10 illustrated in FIG. 6 from different viewing angles. FIG. 5 is a schematic view.

FIG. 7 also illustrates the various directions of translational movement of the lens blank 1 in the ring 10, namely Tx, Ty and Tz, corresponding to the three axes of a basic orthonormal coordinate system, and the directions of rotational movement about each of these translational directions, respectively, namely Rx, Ry and Rz.

It may be seen that the translational directions Tx and Ty are here located in one and the same plane, referred to as the horizontal plane, and that these axes Tx and Ty extend in the diameter of the lens blank 1 whereas the translational direction Tz corresponds substantially to the thickness of the lens blank 1 and here is located in what is referred to as a vertical plane (i.e. orthogonal to the plane comprising the axes Tx and Ty).

Figure 8:
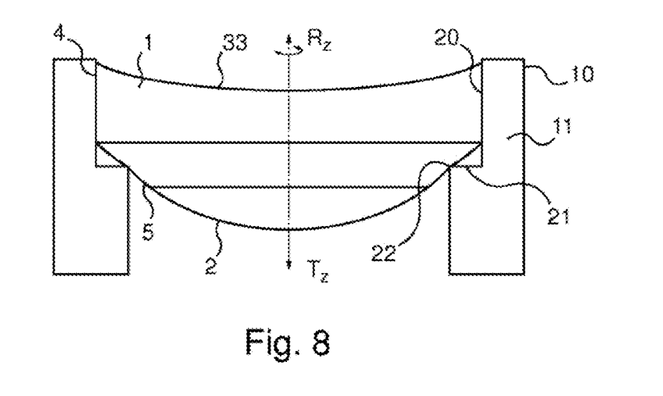
FIG. 8 is a schematic partial view of the cross section referenced VIII-VIII in FIG. 7.

FIG. 8 for its part shows the lens blank 1, partially lodged in the ring 10, in the cross section referenced VII-VII in FIG. 7.

It will be noted that the internal outline 20 of the ring 10 is concentric with the edge face 4 of the lens blank 1.

It will further be noted that when the lens blank 1 is partially lodged in the cavity 13 of the ring 10, the edge face 4 of the lens blank 1 makes contact with the internal outline 20 of the ring and more precisely with curved internal portions of the guiding blocks 16.

Furthermore, the chamfer 5 of the lens blank 1 also at least partially makes contact with the ridge 22 defined by the shoulder 21 of the ring 10.

Furthermore, the flat 6 faces, or even makes contact with, the right portion 19 of the other guiding block 18 of the ring 10.

The first group formed from the first mechanical positioning and complementary control guides, in other words said edge face 4 of the lens blank 1 and the internal outline 20 of the ring 10, allow the lens blank 1 to be reliably positioned, in the translational directions Tx, Ty and in the rotational directions Rx, Ry, on the ring 10.

The second group formed from the second mechanical positioning and complementary control guides, in other words the chamfer 5 of the lens blank 1 and the ridge 22 of the shoulder 21 of the ring 10, allow the lens blank 1 to be reliably positioned, in the translational direction Tz and also in the translational directions Tx, Ty, on the ring 10.

Furthermore, the third group formed from the third mechanical positioning and complementary control guides, in other words the flat 6 and the right portion 19 of the other guiding block 18 of the ring 10, allow the lens blank 1 to be reliably positioned, in the rotational direction Rz, on the ring 10.

Thus, in the position of the lens blank 1 relative to the ring 10 shown in FIGS. 5, 7 and 8, the lens blank 1 is in what is referred to as its definitive position in all the translational directions Tx, Ty, Tz and rotational directions Rx, Ry and Rz. Simply positioning the lens blank 1 on the ring 10 therefore ensures, as described in greater detail below, that the so-called definitive position of the concave face 33 of the lens blank 1 relative to the front face 2 and therefore of the (as yet unmachined) back face relative to the front face of the lens is correct.

The process for manufacturing the optical lens will now be described in greater detail with reference to FIGS. 9 to 11 and also to FIGS. 1 to 3.

The process comprises the step 101 of providing a lens blank SF1, which lens blank SF1 corresponds to the raw (first semi-finished) lens blank such as described above. This lens blank SF1 is made of plastic and has a convex face 32 and a concave face 33 that is not machined and results from molding.

The process comprises the step 102 of coating the concave face 33, also called back face (BK face), of the lens blank SF1. It is a question of applying to this concave face 33 a plastic film (not shown) allowing said face 33 to be protected.

The process comprises the step 103 of blocking the concave face 33 of the lens blank SF1. This blocking step is shown in FIG. 1, in which an assembly comprising the lens blank SF1, here referenced 1, a blocking and holding pin 30 and a binding material 31 here formed of what is referred to as a fusible metal, is shown.

In this step 103, the lens blank SF1 is mounted on a holder (not shown) at the bottom of which the pin 30 is positioned.

This holder for example comprises an injection channel through which the binding metal is injected in liquid form. Once hardened, this metal 31 fastens the pin 30 to the lens blank SF1 via its concave face 33.

The process furthermore comprises the step 110 of machining the convex face 32 of the lens blank SF1, also called the front face. This machining step is also illustrated in FIG. 1, which shows the convex face 32 of the lens blank SF1 and the zone to be machined to form the front face 2 of the optical lens.

The process comprises the step 111 of machining the mechanical positioning guides on the lens blank SF1, namely the generally circular edge face 4, the chamfer 5 and the flat 6. These three mechanical positioning guides produced in the lens blank SF1 allow, as indicated above and also below, the (second semi-finished) lens blank SF2 to be positioned in the positioning ring 10 both in the translational directions Tx, Ty and Tz and rotational directions Rx, Ry and Rz.

This machining step 111 in particular comprises the step 121 of edging an outline of the lens blank SF1 to form the generally circular edge face 4 and thus form the first mechanical positioning guide of the lens blank SF1.

This machining step 111 furthermore comprises the step 122 of chamfering a portion of the lens blank SF1 (located between the generally circular edge face 4 and the convex face 32) in order to form a beveled portion and thus form the second mechanical positioning guide of this lens blank SF1.

This machining step 111 also comprises the step 123 of machining the flat 6 in the outline of the lens blank SF1 in order to form a third mechanical positioning guide for this lens blank SF1.

The machining of the guide in Rz may result in something other than a flat 6, especially shown in FIG. 4, and as a variant this guide may be a notch produced in the generally circular edge face 4.

The steps 110 and 111 may be carried out in one and the same machine tool, in one and the same machining operation or in two successes operations, or in separate machines. The step 110 may be implemented before step 111, or vice versa.

The convex face 32 of the lens blank SF1 and the mechanical positioning guides are machined in the lens blank SF1 relative to each other, and more precisely the convex face is produced relative to the mechanical positioning guides or vice versa. This process therefore allows a positional reference system to be created between the convex face and the mechanical positioning guides.

This relationship is particularly simple to obtain since the two machining steps are carried out at the same time, or consecutively, in one and the same machine tool, which uses one the same machining frame of reference and therefore positions the surface and the positioning guides with high precision relative to each other, or even one and the same surface file.

The process then comprises the step 112 of polishing the front face of the lens blank SF1, which front face is then representative of the front face 2 of the lens since the convex face 32 has been machined.

The process also comprises the step 113 of unblocking the concave face 33 of the lens blank SF1, which step 113 is similar to the unblocking step 115 described above.

The lens blank SF2, also referred to as the second semi-finished lens blank, is then obtained.

Once this second semi-finished lens blank has been produced, the latter may for example be stored and is more often than not sent to another site, especially for production of the back face 3 of the lens 1, by virtue of a different machine tool to that/those used above.

Figure 11:
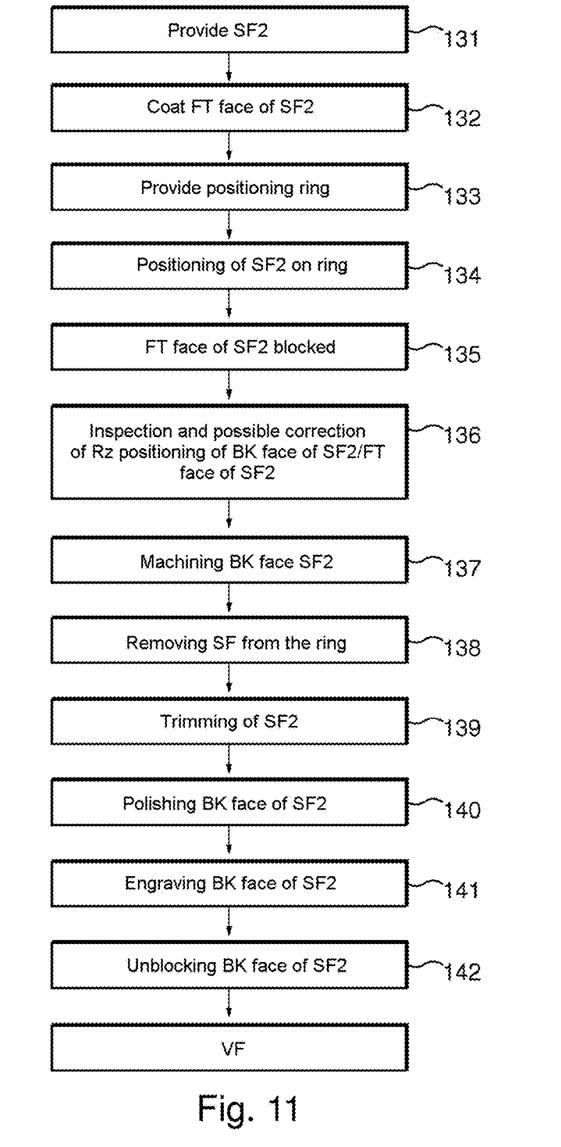
FIG. 11 is a block diagram illustrating other operating steps of the process for manufacturing the optical lens, especially comprising the steps illustrated in FIGS. 2 and 3.

The process for manufacturing this optical lens furthermore comprises, as illustrated in FIG. 11, the step 131 of providing this second semi-finish lens blank, in other words the lens blank SF2.

The process comprises the step 132 of coating the front face 2 of the lens blank SF2. It is here a question of coating the front face 2 with a plastic film (not shown).

The process comprises the step 133 of providing the positioning ring described above, especially with reference to FIGS. 5 to 8, and the step 134 of positioning the lens blank SF2 on this ring 10, as may be seen in FIG. 2.

The lens blank SF2 is positioned on the ring 10 such that this lens blank SF2 is partially lodged in the cavity 13 of this ring 10, the edge face 4 of the lens blank SF2 making contact with the internal outline 20 described by the cavity 13, and in particular with the curved internal portions of the guiding blocks 16, the chamfer 5 of the lens blank SF2 also at least partially making contact with the ridge 22 of the shoulder 21 of the ring 10, and the flat 6 facing, or even making contact, with the internal portion 19 of another guiding block 18 of this ring 10.

Thus, the first group formed from the edge face 4 and the internal outline 20 allow the lens blank SF2 to be reliably, i.e. without requiring subsequent checking, positioned on the ring 10 in the translational directions Tx and Ty and in the rotational directions Rx and Ry.

Furthermore, the second group formed from the chamfer 5 and the ridge 22 of the shoulder 21 also allows the lens blank SF2 to be reliably positioned on the ring 10, essentially in the translational direction Tz but also in the translational directions Tx and Ty.

Lastly, the third group formed from the flat 6 and the right portion 19 also allow the lens blank SF2 to be reliably positioned on the ring 10, in the other rotational direction Rz.

The lens blank SF2 thus positioned is therefore in a definitive position that therefore corresponds to the positioning of the as yet unmachined back face of the lens relative to the front face 2, and here more precisely to the positioning of the concave face 33 of the lens blank SF2 relative to the front face 2.

The process then comprises the step 135 of blocking the front face 2 of the lens blank SF2 in order to block positionally the lens blank SF2 in the ring 10. In this step 135, the lens blank SF2 is mounted on the positioning ring 10 at the bottom of which the blocking and holding pin 30 (identical to the holder 30 shown in FIG. 1) is positioned.

A binding material 31 taking the form of a liquid metal is injected through the injection channel 25 into the cavity 13 (between the front face 2 and the pin 30 and the bottom wall 23 of the ring 10), and once hardened, this metal 31 fastens the pin 30 to the lens blank SF2 via its concave face 33.

The process may furthermore comprise the step 136 of inspecting the position in the rotational direction Rz of the concave face 33 of the lens blank SF2 relative to the front face 2.

In the example illustrated here, this inspection step 136 is obsolete since, by virtue of the third mechanical positioning guide, namely the flat 6, and by virtue of the third complementary mechanical control guide, namely the internal portion 19, the position of the lens blank SF2 in Rz is fixed, i.e. the lens blank SF2 cannot move rotationally in Rz since it is immobilized in Rz in its definitive position.

In the variants indicated above where it is not a question of a flat 6 and a right internal portion 19 as shown in FIGS. 4 and 6, but merely a question of a notch produced in the lens blank SF2, then this step 136 of inspecting the position of the lens blank SF2 in Rz in the ring 10 may be necessary.

This inspection step 136 may for example be carried out by eye by an operator, or by virtue of a mechanical probe or even by virtue of an imaging device such as a video camera.

This inspection step 136 may therefore comprise the step of determining possible positioning errors in Rz and the step of correcting these possible positioning errors.

This correction step is here carried out directly on a surface file defining the back face 3 of the lens to be obtained.

This inspection and optional correction step 136 therefore furthermore optionally comprises a step of transmitting a corrected file to a machine tool configured to produce the back face 3 of the optical lens.

The process furthermore comprises the step 137 of machining the concave face 33 of the lens blank SF2 to obtain the back face 3 of the optical lens 1.

This step is shown in FIG. 3 in which the lens blank SF2 blocked positionally on the pin 30 and the concave face 33 to be machined of the lens blank SF2 to obtain the back face 3 of the optical lens 1 may be seen.

The process furthermore comprises the step 138 of removing the lens blank SF2 thus machined from the ring 10 then the step 139 of trimming this lens blank SF2. This trimming step is carried out to a preset diameter.

The process furthermore comprises the step 140 of polishing the back face 3 of the lens blank SF2 and the step 141 of engraving, or marking by engraving, said back face 3 of the lens blank SF2.

Lastly, the manufacturing process comprises the step 142 of unblocking the front face 2 of the lens blank SF2 in order to make the finished optical lens 1 available to be formed, subsequently, into a finished spectacle lens (VF).

FIGS. 12 to 15 illustrate the lens blank 1 with various variant embodiments of the chamfer 5.

Figure 12:
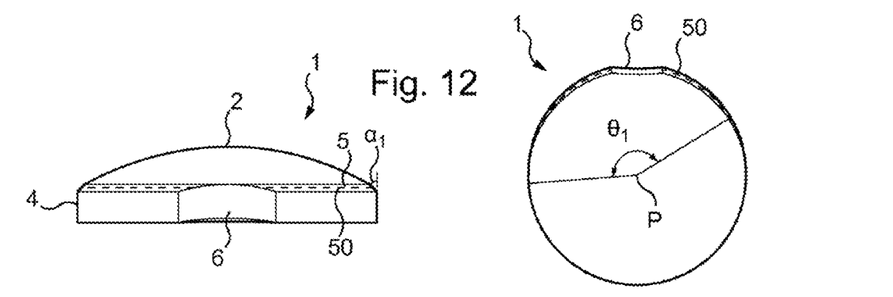
FIGS. 12 to 15 each show the lens blank in FIGS. 2 and 3, as seen from in front and above, according to a plurality of variant embodiments of one sloped portion that it comprises.
Figure 13:
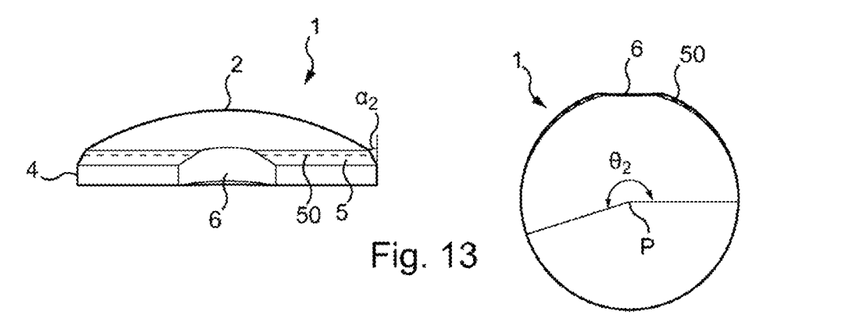

In FIGS. 12 and 13, the lens blank 1 has a front face, here a progressive face, and the chamfer 5 that it comprises has an angle of inclination $\alpha_1$ of about 45° and an angle of inclination $\alpha_2$ of about 20°, respectively, relative to the edge face 4 of the lens blank 1.

These distinct angles of inclination $\alpha_1$ and $\alpha_2$ of the chamfer 5 are determined so as to increase contact between the lens blank 1 and the positioning ring 10 depending on at least one preset constraint.

FIGS. 12 and 13 illustrate perimeters of contact 50 between the lens blank 1 and the ring 10.

These perimeters of contact 50 are of different lengths along the chamfer 5; and are representative of lengths of angular sectors, denoted $\theta_1$ and $\theta_2$, passing through the optical center or prism reference point or even the geometric center P of the lens, from which sectors the length of the flat 6 of the lens blank 1 must be subtracted.

The perimeter of contact 50 between the shoulder of a given ring and the chamfer 5 of angle of inclination $\alpha_1$ is representative of the smaller angular sector $\theta_1$ which is smaller than the angular sector $\theta_2$ that represents the perimeter of contact 50 between the shoulder of this given ring and the chamfer 5 of angle of inclination $\alpha_2$.

In other words, the percentage of contact between the lens blank illustrated in FIG. 12 and the given ring is less than the percentage of contact between the lens blank illustrated in FIG. 13 and this given ring.

Therefore, the lens blank illustrated in FIG. 13 will be more stable in the given ring than the lens blank illustrated in FIG. 12 for the same ring.

Figure 14:
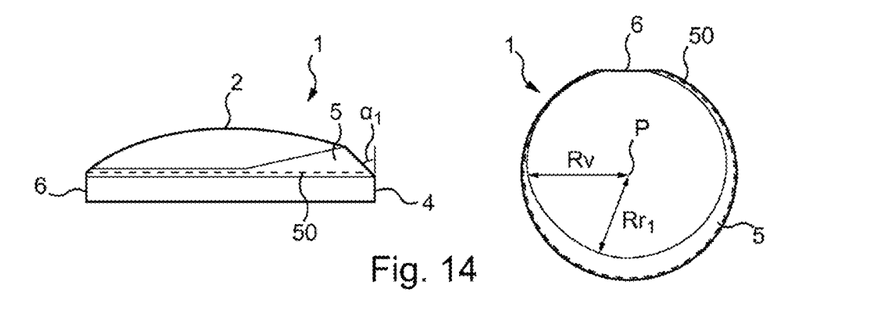
Figure 15:
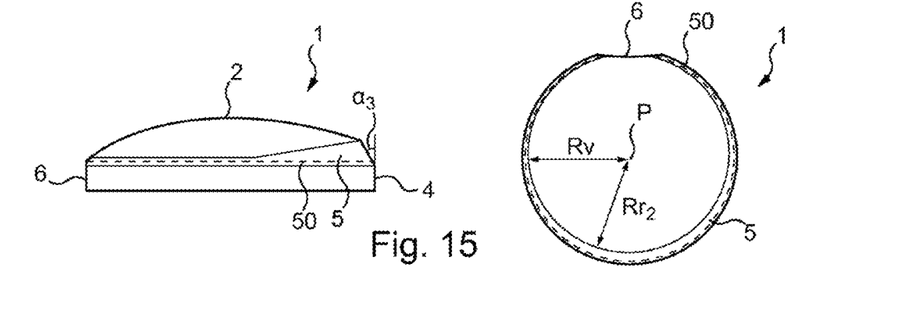

In FIGS. 14 and 15, the lens blank 1 has a front face, here a regressive face, and the chamfer 5 that it comprises has an angle of inclination $\alpha_1$ of about 45° and an angle of inclination $\alpha_3$ of about 30°, respectively, relative to the edge face 4 of the lens blank 1.

These distinct angles of inclination $\alpha_1$ and $\alpha_3$ of the chamfer 5 are also determined so as to increase contact between the lens blank 1 and the positioning ring 10 depending on at least one preset constraint.

FIGS. 14 and 15 also illustrate perimeters of contact 50 between the lens blank 1 and the ring 10, these perimeters 50 here having one and the same length substantially equal to the length of the chamfer 5.

FIGS. 14 and 15 furthermore illustrate radii Rv representative of the radius of an optically useful zone desired for the optical lens and radii $Rr_1$ and $Rr_2$ representative of the minimum radius of an optically useful zone obtained on the lens blank 1 with the chamfer 5 produced in the latter, these radii passing through the optical center or the prism reference point or even the geometric center P of the lens.

The optically useful zone is the zone of the optical lens that has the optical features associated with the prescription of the wearer. It is generally a question of a zone of the lens that is located in a spectacle frame when this lens is cut to the shape of the frame and fitted in the latter.

This optically useful zone must not contain the chamfer 5.

The radius $Rr_1$ obtained with a chamfer 5 of angle of inclination $\alpha_1$ is smaller than the radius $Rr_2$ obtained with a chamfer 5 of angle of inclination $\alpha_3$.

In other words, the diameter of the optical lens obtainable with a chamfer 5 of angle of inclination $\alpha_3$ is larger than the diameter of the optical lens obtainable with a chamfer 5 of angle of inclination $\alpha_1$.

Therefore, the lens that can be obtained from the lens blank illustrated in FIG. 15 has a larger aperture than the lens obtainable with the lens blank illustrated in FIG. 14.

The aperture of the optical lens is representative of the size of the optically useful zone.

The two constraints given above, namely the stability of the lens blank in a given ring and the aperture of the lens, may be used individually or in combination to determine the angle of inclination of the chamfer produced in the lens blank.

It will be noted that in the examples given above the lens blanks had progressive and regressive surfaces, but lens blanks with toroidal surfaces could also be used.

More generally, the angle of inclination of the chamfer produced in the lens blank is advantageously determined once the lens blank has a surface that is no longer axisymmetric.

The angle of inclination is determined before steps 110 and 111 of machining the front face and the guides in the lens blank.

The angle of inclination is for example set when the geometry of the lens and the geometry of the guides in the lens blank are defined for a given ring.

The angle of inclination is for example determined by iterative calculation, by calculating the perimeter of contact between the chamfer and the shoulder of a given ring until an angle of inclination is obtained that allows a given percentage of contact, for example higher than about 55% of the perimeter of contact between the chamfer and the shoulder, to be achieved; with the aim of meeting the stability constraint.

As a variant or enhancement, the angle of inclination is for example determined by iterative calculation, by calculating the resultant radius of the chamfered lens blank until an angle of inclination is obtained that allows a resultant radius that is at least equal to or even larger by about 1 mm than a given lens radius to be achieved, for example higher than about 55% of the perimeter of contact between the chamfer and the shoulder; with the aim of meeting the aperture constraint.

As variants (not illustrated):
- the first face of the lens blank to be machined is not the front face but rather the back face, the front face therefore being machined next; more generally, the expressions "first face" and "second face" may refer to either face, independently of its position (front or back) and independently of whether said face is concave or convex in shape;
- the sloped portion is not a beveled or conical portion but rather a portion taking the form of a fillet or shoulder, and here the term "chamfer" or "molding" is understood to mean a sloped portion taking any one of these forms;
- the positioning ring does not have a generally cylindrical shape but rather a generally rectangular shape, and this ring may have more or fewer guiding blocks;
- the chamfer is not produced in the entire outline of the lens blank but only in one portion of the outline, or even in a plurality of portions of the outline;
- the third mechanical positioning guide in the lens blank is not a flat or a notch, but rather a mark produced by engraving the periphery of the front face;
- the lens blank is not removed from the ring and the process does not comprise a step of trimming the lens blank to a set diameter; and the engravings produced in the concave face of the lens blank are positioned relative to the chamfer; and the step of engraving the concave face of the lens blank is carried out before the trimming step and/or polishing step, i.e. when the lens blank is mounted in the ring;
- the back face of the lens does not comprise temporary or permanent markings but it is rather the front face of the lens that has them;

the steps of unblocking the lens blank and removing the lens blank from the ring are carried out before the step of machining the back face;

the correction step is not carried out directly on the surface file defining the back face 3 of the lens to be obtained but rather on the angular position of a shaft of the machine tool; and/or the binding material is different from an injected liquid metal, it instead being a question of a liquid wax or a mechanical fastening device.

It is recalled more generally that the invention is not limited to the examples described and shown.

The invention claimed is:

1. A process for manufacturing an optical lens having a first face (2) and a second face (3) opposite said first face (2), comprising a step of positioning said second face (3) relative to said first face (2) for the machining of said second face (3), which positioning step comprises steps of:

providing (131) a lens blank (1) for forming said optical lens, which lens blank (1) has an upper face (32) for forming said first face (2), a lower face (33), opposite said upper face (32), for forming said second face (3), and at least one positioning guide;

providing (133) a positioning ring (10) having at least one control guide;

mounting (134) said lens blank (1) on said positioning ring (10);

positionally blocking (135) said lens blank (1) on a blocking and holding pin (30), said positioning ring (10) then being interposed between said lens blank (1) and said blocking and holding pin (30);

wherein said lens blank (1) comprises a generally circular edge face (4) forming a first mechanical positioning guide and at least one sloped portion (5) forming a second mechanical positioning guide, said at least one sloped portion (5) being located between said generally circular edge face (4) and said upper face (32); said positioning ring (10) has a generally cylindrical shape and comprises a cavity (13) defining a generally circular internal outline (20) forming a first complementary control guide, which internal outline (20) is concentric with said edge face (4) of said lens blank (1), and a shoulder (21) forming a second complementary control guide; and said step (134) of mounting said lens blank (1) on said ring (10) comprises the step of at least partially lodging said lens blank (1) in said cavity (13) of said ring (10), said edge face (4) of said lens blank (1) at least partially making contact with said internal outline (20) of said ring (10) and said at least one sloped portion (5) of said lens blank (1) also making contact with said shoulder (21) of said ring (10), wherein said step of providing (131) said lens blank (1) comprises steps of:

edging (121) at least partially the outline of said lens blank (1) in order to form said generally circular edge face (4) and thus form said first mechanical positioning guide of said lens blank (1); and chamfering (122) at least partially one portion of said lens blank (1), which portion is located between said generally circular edge face (4) and said convex face (32), in order to form said at least one sloped portion (5) and thus form said second mechanical positioning guide of said lens blank (1).

2. The process as claimed in claim 1, wherein said lens blank (1) further comprises a third mechanical positioning guide (6) in said generally circular edge face (4), and said positioning ring (10) comprises a third complementary control guide (18, 19) in said internal outline (20), said third mechanical positioning guide (6) and said third mechanical control guide (18, 19) being configured to immobilize rotationally said lens blank (1) about an axis (Tz) passing through said upper (32) and lower (33) faces of said lens blank (1), relative to said ring (10), when said lens blank (1) is mounted on said ring (10).

3. The process as claimed in claim 1, wherein said lens blank (1) further comprises a third mechanical or visual positioning guide (6) in said generally circular edge face (4) or at the periphery of said upper face (32); and said process further comprises a step (136) of visually or mechanically controlling the angular position of said lens blank (1) relative to said ring (10), which angular position is measured relative to an axis (Tz) passing through said upper (32) and lower (33) faces of said lens blank (1), when said lens blank (1) is mounted on said ring (10); and a step of determining a possible angular position error.

4. The process as claimed in claim 1, further comprising a step of machining (137) said lower face (33) of said lens blank (1) in order to form said second face (3) of said optical lens.

5. The process as claimed in claim 4, further comprising steps of:

trimming (139) said lens blank (1) to a preset diameter;

polishing (140) said previously machined second face (3); and engraving (141) said previously machined second face (3).

6. The process as claimed in claim 1, further comprising a step of coating (132) said upper face (32) of said lens blank (1) before said step of mounting said lens blank (1) on said positioning ring (10).

7. The process as claimed in claim 1, wherein said positioning ring (10) further comprises an injection channel (25) opening onto said cavity (13) and said step (135) of positionally blocking said lens blank (1) on said blocking and holding pin (30) comprises the step of injecting a binding material (31), into said injection channel (25).

8. The process as claimed in claim 1, wherein said step of providing (131) said lens blank (1) further comprises step of:

machining (123) said third mechanical positioning guide of said lens blank (1) into said outline of said lens blank (1).

9. The process as claimed in claim 1, wherein said step of providing (131) said lens blank (1) further comprises a step of machining (110) said upper face (32) of said lens blank (1) in order to form said upper face (2) of said optical lens.

10. An assembly comprising a lens blank (1) for forming an optical lens having a first face (2) and a second face (3) opposite said first face (2), and a positioning ring (10) on which said lens blank (1) is mounted, which lens blank (1) has an upper face (32) for forming said first face (2) and a lower face (33), opposite said upper face (32), for forming said second face (3); wherein said lens blank (1) further comprises a generally circular edge face (4) forming a first mechanical positioning guide and at least one sloped portion (5) forming a second mechanical positioning guide, said at least one sloped portion (5) being located between said generally circular edge face (4) and said upper face (32); said positioning ring (10) has a generally cylindrical shape and comprises a cavity (13) defining a generally circular internal outline (20) forming a first complementary control guide, which internal outline (20) is concentric with said edge face (4) of said lens blank (1), and a shoulder (21) forming a second complementary control guide; said lens blank (1) being configured to be at least partially lodged in said cavity (13) of said ring (10), said edge face (4) of said lens blank (1) being configured to at least partially make contact with said internal outline (20) of said ring (10) and said at least one sloped portion (5) of said lens blank (1) being configured to also make contact with said shoulder (21) of said ring (10), wherein said lens blank (1) comprises a circular chamfer (5) forming said sloped portion, and said ring (10) comprises a ridge (22) defined by said shoulder (21), said circular chamfer (5) bearing against said ridge (22) when said lens blank (1) is partially lodged in said ring (10).

11. The assembly as claimed in claim 10, wherein said circular chamfer (5) has a slope comprised between about 20° and about 45°.

12. The assembly as claimed in claim 10, wherein said lens blank (1) further comprises a third mechanical positioning guide (6) in said generally circular edge face (4), and said positioning ring (10) comprises a third complementary control guide (18, 19) in said internal outline (20), said third mechanical positioning guide (6) and said third mechanical control guide (18, 19) being configured to immobilize rotationally said lens blank (1) about an axis (Tz) passing through said upper (32) and lower (33) faces of said lens blank (1), relative to said ring (10), when said lens blank (1) is partially lodged on said ring (10).

13. The assembly as claimed in claim 12, wherein said third mechanical positioning guide (6) is located parallel to a nasal-temporal axis of said lens blank (1) for forming said optical lens.

14. The assembly as claimed in claim 10, wherein said positioning ring (10) further comprises an injection channel (25) opening onto said cavity (13) and said assembly further comprises a blocking and holding pin (30) on which said lens blank (1) is configured to be positionally blocked by virtue of a binding material injected through said injection channel (25), said positioning ring (10) then being interposed between said lens blank (1) and said blocking and holding pin (30).

15. The assembly as claimed in claim 10, wherein said ring (10) comprises a plurality of guiding blocks (16) regularly distributed around said cavity (13) and defining said internal outline (20).

16. An assembly comprising a lens blank (1) for forming an optical lens having a first face (2) and a second face (3) opposite said first face (2), and a positioning ring (10) on which said lens blank (1) is mounted, which lens blank (1) has an upper face (32) for forming said first face (2) and a lower face (33), opposite said upper face (32), for forming said second face (3); wherein said lens blank (1) further comprises a generally circular edge face (4) forming a first mechanical positioning guide and at least one sloped portion (5) forming a second mechanical positioning guide, said at least one sloped portion (5) being located between said generally circular edge face (4) and said upper face (32); said positioning ring (10) has a generally cylindrical shape and comprises a cavity (13) defining a generally circular internal outline (20) forming a first complementary control guide, which internal outline (20) is concentric with said edge face (4) of said lens blank (1), and a shoulder (21) forming a second complementary control guide; said lens blank (1) being configured to be at least partially lodged in said cavity (13) of said ring (10), said edge face (4) of said lens blank (1) being configured to at least partially make contact with said internal outline (20) of said ring (10) and said at least one sloped portion (5) of said lens blank (1) being configured to also make contact with said shoulder (21) of said ring (10), wherein said at least one sloped portion (5) of said lens blank (1) has an angle of inclination ($\alpha_1$, $\alpha_2$, $\alpha_3$) relative to said edge face (4) of said lens blank (1), which angle of inclination ($\alpha_1$, $\alpha_2$, $\alpha_3$) is set so as to increase contact between said lens blank (1) and said positioning ring (10) depending on at least one preset constraint.

17. The assembly as claimed in claim 16, wherein said angle of inclination ($\alpha_1$, $\alpha_2$, $\alpha_3$) of said at least one sloped portion (5) is set depending on a characteristic representative of a perimeter of contact between said at least one sloped portion (5) of said lens blank (1) and said shoulder (21) of said ring (10) in order to ensure the stability of said lens blank (1) in said ring (10).

18. The assembly as claimed in claim 16, wherein said angle of inclination ($\alpha_1$, $\alpha_2$, $\alpha_3$) of said at least one sloped portion (5) is set depending on a characteristic representative of an optically useful zone of said optical lens in order to ensure a preset aperture for said optical lens.

19. The assembly as claimed in claim 17, wherein said angle of inclination ($\alpha_1$, $\alpha_2$, $\alpha_3$) of said at least one sloped portion (5) is set depending on a characteristic representative of an optically useful zone of said optical lens in order to ensure a preset aperture for said optical lens.

20. The assembly as claimed in claim 11, wherein said lens blank (1) further comprises a third mechanical positioning guide (6) in said generally circular edge face (4), and said positioning ring (10) comprises a third complementary control guide (18, 19) in said internal outline (20), said third mechanical positioning guide (6) and said third mechanical control guide (18, 19) being configured to immobilize rotationally said lens blank (1) about an axis (Tz) passing through said upper (32) and lower (33) faces of said lens blank (1), relative to said ring (10), when said lens blank (1) is partially lodged on said ring (10).

* * * * *